United States Patent [19]

Pusateri

[11] Patent Number: 4,766,361
[45] Date of Patent: Aug. 23, 1988

[54] BATTERY CHARGER HAVING AN INTERLOCKING ASSEMBLY FOR ACCOMMODATING INCREASED CHARGING RATE CAPACITY

[75] Inventor: Vincent J. Pusateri, Norcross, Ga.

[73] Assignee: General Electric Company, Schenectady, N.Y.

[21] Appl. No.: 99,961

[22] Filed: Sep. 23, 1987

[51] Int. Cl.⁴ .......................... H02J 7/00; H01M 10/46
[52] U.S. Cl. ............................................ 320/2; 320/15
[58] Field of Search ........................................ 320/2–4, 320/6, 15

[56] References Cited

U.S. PATENT DOCUMENTS

| | | | |
|---|---|---|---|
| 3,579,075 | 5/1971 | Floyd | 320/2 |
| 4,232,260 | 11/1980 | Lambkin | 320/2 |
| 4,403,182 | 9/1983 | Yeh | 320/2 |
| 4,467,264 | 8/1964 | Blake | 320/2 |

Primary Examiner—R. J. Hickey
Attorney, Agent, or Firm—John P. McMahon; Phillip L. Schlamp; Fred Jacob

[57] ABSTRACT

A battery charger assembly comprising a charging network and four charging units for charging four major cell types of rechargeable batteries having desired different charging rate currents is disclosed. The battery charger assembly further comprises at least a pair of terminal for accepting a fifth major rechargeable battery. The battery charging assembly selectively and simultaneously provides the desired charging rate to any of the five major rechargeable cell types.

7 Claims, 6 Drawing Sheets

BATTERY CHARGER HAVING AN INTERLOCKING ASSEMBLY FOR ACCOMMODATING INCREASED CHARGING RATE CAPACITY

BACKGROUND OF THE INVENTION

This invention relates to a battery charging assembly having a charging network that develops three different charging rate currents and a charging unit having various cavities that allows the correct charging rate current to be applied to various rechargeable batteries that may be inserted into the cavities.

An increasing number of consumer products are operated by one or more rechargeable cells, for example, nickel-cadmium cells available in many different sizes having various electrical charging characteristics that may be rechargeable by consumer battery chargers.

One such battery charger or assembly is described in U.S. Pat. No. 4,467,264 of Blake et al. assigned to the same assignee as the present invention and herein incorporated by reference. While such a battery charger assembly serves it desired purpose, it is limited to providing two (2) different charging rates applicable to standard major "AA", "C", and "D" rechargeable cells. It is desired that a battery charger assembly provides an additional charging rate current so as to accommodate additional standard major "AAA" and "9 volt" type rechargeable cells.

Increasing the number of major cells that are capable of being charged by a battery charging assembly also increases the possibility that a particular cell may be inserted into the battery charger assembly in an improper manner so as to allow the battery charger assembly to supply the incorrect charging rate current to the particular cell being charged or even inhibit the battery charger assembly from supplying any charging rate current to the cell attempting to be charged. It is desired that means be provided for a battery charger assembly for accepting any of the five major cells in such a manner that the proper charging rate is supplied to the one or more cells being charged.

Accordingly, it is an object of the present invention to provide a battery charging assembly having three different charging rates so as to accommodate the five major types of rechargeable cells.

It is another object of the present invention to provide a battery charger assembly that has means for easily accepting any of the five major types of rechargeable cells and providing the proper charging rate to any of the cells being charged.

SUMMARY OF THE INVENTION

The present invention is directed to a battery charging assembly for recharging any of a plurality of the major rechargeable cells at the desired charging rate current for the cell being charged.

The charging assembly provides a charging rate current to at least one rechargeable cell selected from a group of cells having a first, a second and a third desired charging rate current.

The charging assembly comprises means for connecting to an external power source and a charging network coupled to the external source which provides a first and a second charging path with each path having three branches to respectively generate the first, second and third charging rate currents. The assembly further comprises means for accepting the selected at least one cell. The cell accepting means is connected to the charging network and comprises pairs of stationary and slideable charging contacts for receiving the charging current in the first and second charging paths, respectively. The cell accepting means is further comprised of cavities each related to the pair of the charging contacts and are contoured and dimensioned so as to appropriate connect the at least one cell to the desired first, second or third charging rate currents. The slidable members of the charging contacts are positionable relative to the cavities so as to allow the charging network to develop only one of the three charging rate currents related to the selected rechargeable cells.

DETAILED DESCRIPTION OF THE PREFERRED EMBODIMENTS

Figure 1:
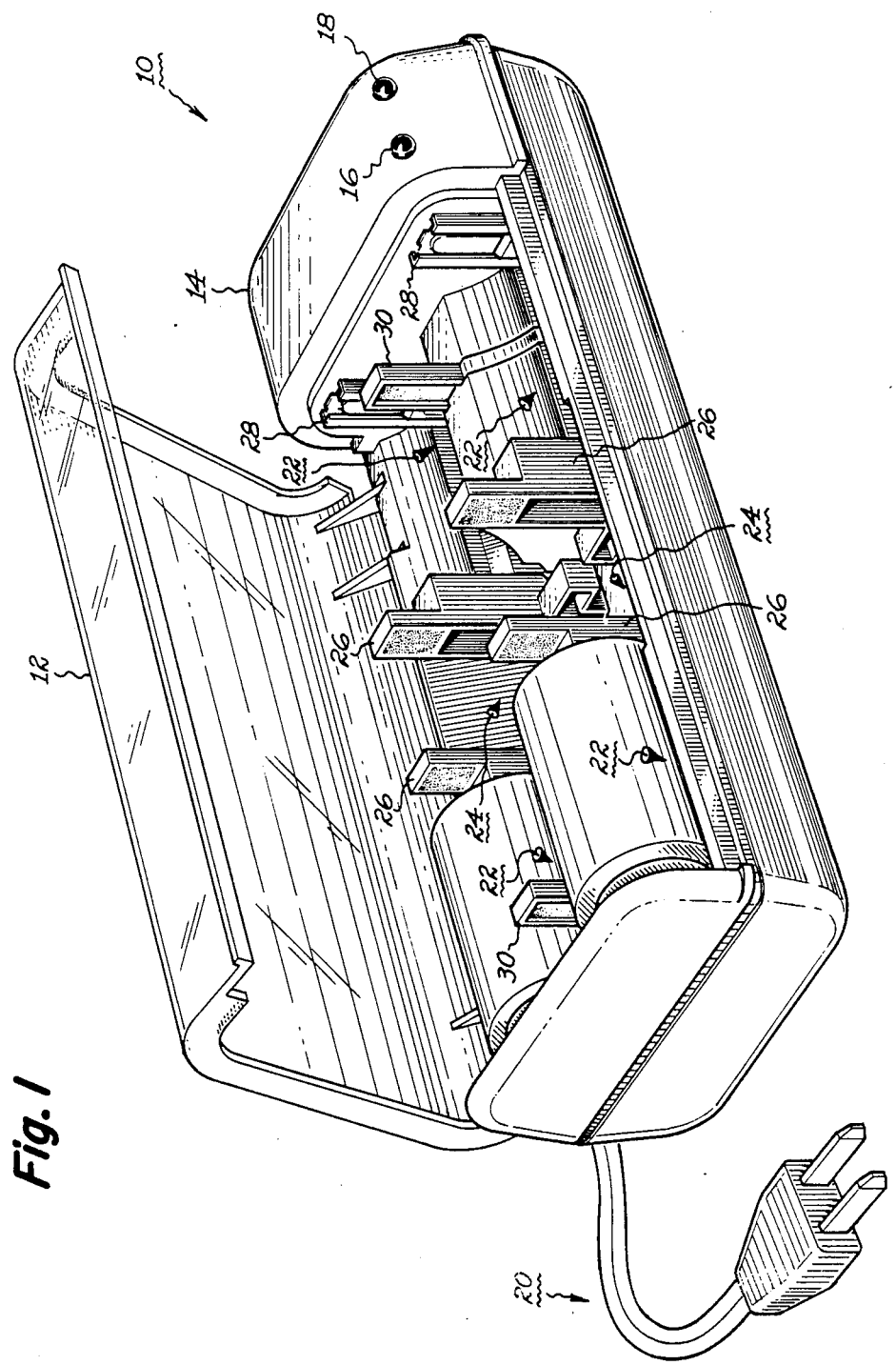
FIG. 1 is a perspective view of the battery charging assembly of the present invention.

Referring to the drawing, FIG. 1 shows a perspective view of the battery charging assembly 10, in accordance with the present invention having lodged therein a standard "D" type rechargeable cell. The charging assembly 10 has a retractable door or cover 12 for enclosing the assembly along with any rechargeable cells that may be lodged therein. The charging assembly is comprised of a generally smooth rectangular shaped housing 14 which is preferably formed of an inorganic plastic material. The assembly 10 has two light emitters devices 16 and 18, to be described hereinafter, to indicate the delivery of one or more charging rate currents to the one or more cells being charged thereby. A plug and cord arrangement 20 is provided as means for connecting the battery charger assembly 10 to an external power source such as a typically available household power.

The assembly 10 further has means for accepting rechargeable cells comprised of four (4) charging units 22 for accommodating either of the four standard major rechargeable cells "AAA", "AA", "C" and "D" and two sets 24 of one pair of terminals (not shown) for accommodating the "9 Volt" standard major rechargeable cell. Each of the charging units 22 have a slidable or moveable shroud 26, a stationery member 28 and a stationary member 28A (not shown) all of which serve as a pair of charging contacts for receiving the charging rate current in the first and second charging paths of the charging network to be described hereinafter with regard to FIG. 6. Each adjacent pair of charging units 22 has an ejector 30 which assist in removing the rechargeable cells from any of charging units 22.

Each of the charging units 22 comprises a plurality of shaped cavities 34, $34_A$, 36 and 38. Each of the cavities 34 and $34_A$ extend inwardly to an edge 40 of a steep wall 42. The shaped cavity $34_A$ shares part of cavity 34 and is shown thereby by means of a phantom line 44. Similarly, shaped cavity 36 shares part of cavity 38 which has a bottom portion 38A. The stationary member 28A has an upper portion 28B which extends from stationary member 28 and cooperates with and provides the bottom portion for cavity 36. A smooth entrance into cavity 36 is provided by a slopped side wall 46 which mates with steep wall 42. The cavities 34 and $34_A$ are respectively shaped, contoured and dimensioned to conform to and accommodate the rechargeable cell types "D" and "C". Similarly, cavity $38_A$ and member $28_B$ are contoured and dimensioned to conform to and accommodate the rechargeable cell type "AA". Further, cavity 38 having bottom portion $38_B$ is contoured and dimensioned to conform to and accommodate the rechargeable cell type "AAA". All of the cavities are also dimensioned to limit the depth to which each of the sized cells drop or enter into their respective cavities.

Figure 2:
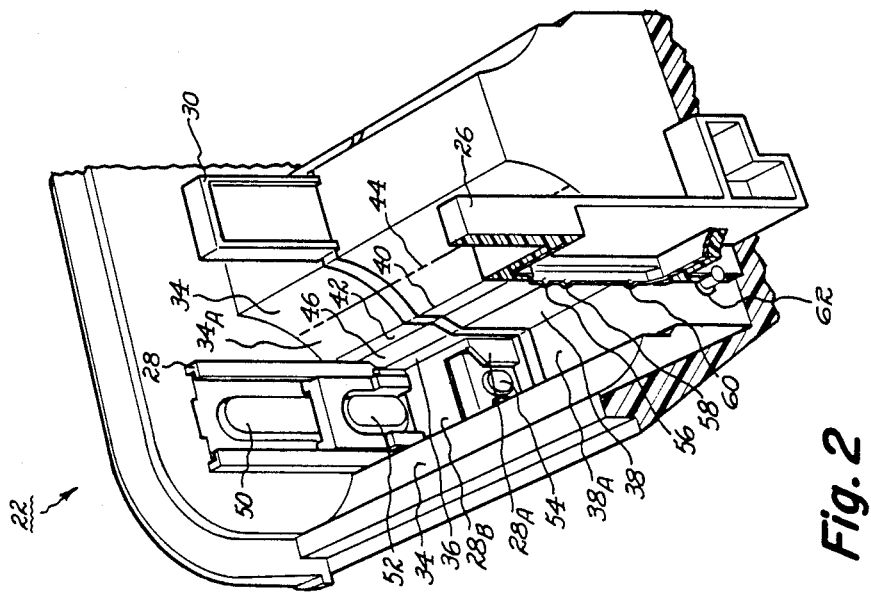
FIG. 2 is a perspective view of a housing having shaped cavities related to each of four charging units of the present invention.

FIG. 2 further shows the ejector member 30 which assists in the removal of any of the cells contained in any of the related cavities of charging unit 22. The side portion of ejector member 30 is shaped to conform to the cavities 34, $34_A$, 36 and 38 along with steep wall 42 and sloped wall 46. The ejector 34 has a low portion which forms part of the lower portion $38_A$ of the shaped cavity 38. The ejector member 30 is arranged so as to be movable when pulled, in an upward manner, to contact in a direction approximately perpendicular to at least a portion of any of the various sized cells that may be lodged in any of the plurality of cavities of the charging unit 42. The contacting ejector assisting in raising in an upward manner, the various sized cells so as to more easily allow their removable from the cavities. Releasing the ejector allows it to return to its home position conforming to its related shaped cavities.

One of the closed ends of cavities 34, 34A and 36 is formed by stationary member 28, whereas, one of the closed ends of cavity 38 is formed by stationary member 28A. The other end of all the cavities are closed by the slideable shroud or member 26. The stationary member 28 has metallic member 50 which mates with and provide electrical contact with the positive (+) terminal of each of the "C" and "D" type rechargeable cells. The stationary member 28 further has a metallic member 52 which mates with and provides electrical contact with the positive (+) terminal of the "AA" rechargeable cell. Similarly, the stationery member 28A has metallic member 54 which mate with and provides electrical contact with the positive (+) terminal of the AAA type rechargeable cell. The stationary members 28 and 28A are arranged to form a slot type configuration to allow the positive (+) terminals of the respective rechargeable cells to fit into and mate with their associated metallic member.

The slidable member 32 arranged to close the opened end of each of the plurality of cavities has a series of protrusions 56, 58, 60 and 62 which are metallic strips and mate with the negative (−) terminals of the rechargeable cells. The protrusions 56 and 58 mate with the negative (−) terminals of the C and D cells when so housed in the charging unit 22. The protrusion 60 mates with the negative terminal of the AA cell when so lodged in the housing, whereas, protrusion 62 mates with the negative (−) terminal of the AAA cell when so lodged in the charging unit 22.

Figure 3:
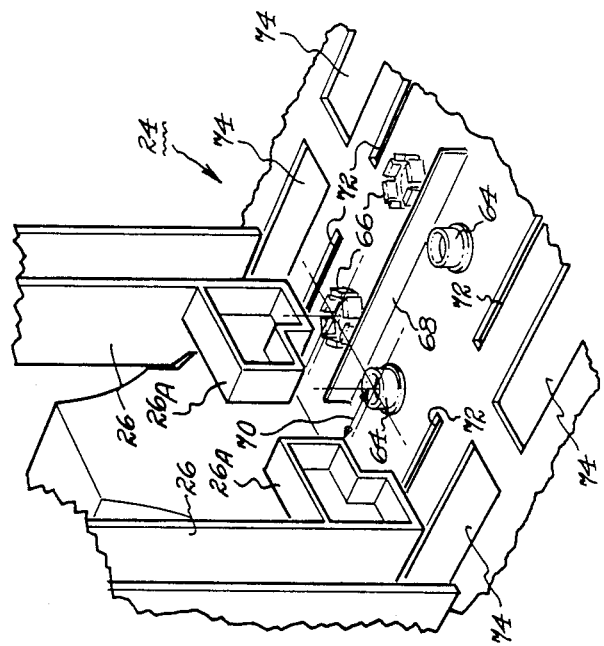
FIG. 3 is a illustration showing the terminal arrangement for connecting to a 9 Volt rechargeable cell.

The means for accepting and charging the "9 Volt" cell may be discussed with regard to FIG. 3, showing two sets of contacts 24 each comprising terminals 64 and 66 respectively spaced apart from each other so as to mate the negative (−) and positive (+) terminals of the 9 Volt cell which are embedded in and extend out of its upper end. A member 68 is preferably related to the set 24 so as to limit the depth to which the "9 Volt" cells are insertable into terminals 64 and 66. The mid-portions of terminals 64 and 66 are spaced apart from the outermost edge of an at-rest extension member 26A of the moveable member 26 by a distance 70. Each of the extension member 26A, for each of the charging units, has a lower portion mating into and sliding along a channel 72. Similarly, the sliding member 28 has metallic member, interconnecting the protrusions 56, 58, 60 and 60, which is conformed to mate into and slide along a channel 74. The member 28 is selected so as to be slidable by an amount which exceeds the amount of 70 so as to provide an interlocking function between the charging of cells lodged in the charging units 22 and the charging of the "9 Volt" cell which may be described with reference to FIG. 4 which is a view looking into one of the charging unit 22 located near the cover member 12 shown in FIG. 1.

Figure 4:
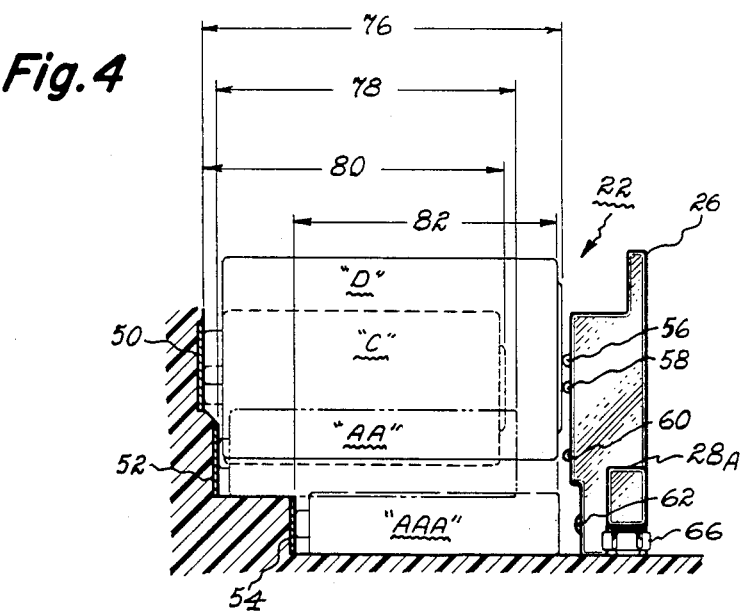
FIG. 4 is a cross-sectional view showing the shaped cavities for each charging unit for accommodating four of the major rechargeable cells related to the present invention.

FIG. 4 shows the lodging of the rechargeable cell type D (shown in solid), the type C cell (shown at phantom), the type AA (shown in phantom) and the type AAA (shown in phantom). From FIG. 4 it is seen that when a "D" cell is placed into charging unit it positions the extension 28A over the terminal 66 so as to prevent the insertion of the "9 Volt" battery into terminals 64 and 66 and thereby interlocking or inhibit its possible charging. This interlocking function with the "9 Volt" cell is also related to cells "AA" and "AAA" and also preferably with cell "C". The interlocking function between the cells "AAA", "AA", "C" and "D" is also determined by the postion of the slideable member 26 having protrusions 56, 58, 60 and 62 relative to the metallic members 50, 52 and 54.

The spacing between the metallic member 50 and protrusions 56 and 58 which is also the length dimension of the "D" cell, is shown as a distance 76. The spacing between the metallic member 50 and the protrusions 56 and 58, if touching the "C" cell, is a distance 78 which is also the length dimension of the "C" cell. The spacing between the metallic member 52 and the protrusion 60, if touching the "AA" cell, is a distance 80 which is also the length dimension of the "AA" cell. Similarly, the spacing between metallic member 54 and the protrusion 62, if touching the "AAA" cell, is a distance 82 which is also the length dimension of the "AAA" cell. The slideable member, by means of a spring mechanism installed in channel 74, is allowed to move outward by applying a lateral force as to allow the related rechargeable cell to be placed into the charging unit 22 at their related distances. The spring mechanism allow the slideable member to apply a force against any of the installed cells so as to provide a good electrical thereon. In the absence of any installed cell, the slideable member returns to its home position.

From FIG. 4 it is seen, that if a "D" cell is installed in charging unit 22 it prevents the slideable member 26, in particular its protrusion, from contacting the "C" and "AA" and "AAA" cells. Similarly with the "D" cell removed, when the "AAA" cell is installed in the charging unit 22 it prevents the slideable member 26 from contacting the "AA" and "C" cells. Further, with "D" and "AA" cells removed, when the AA battery is installed in the charging unit 22 it prevents the slideable member from contacting the "C" cell. This prioritizing of cells selection is interlocking with the charging network to allow the proper charging rate current to be applied to the particular cell installed in the charging unit 22 in a manner as to be described with regard to FIG. 6.

Figure 5:
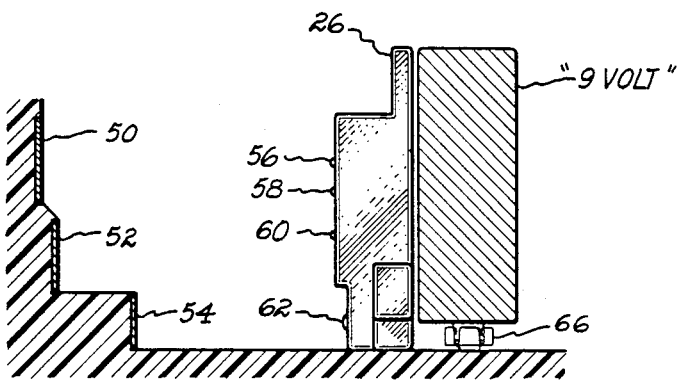
FIG. 5 is a cross-sectional view showing the inter-relationship between the arrangements for charging a 9 Volt cell and the four other major rechargeable cells.

The interlocking function of the charging of the "9 Volt" cell and the "D", "C", "AA" and "AAA" may be seen by comparison between FIG. 4 and FIG. 5. FIG. 5 shows a "9 Volt" cell inserted into one of its related terminal 66. For such an insertion the movable member 26 is placed into a position, relative to the metallic strips 50, 52 and 54, which is less than distances 76, 80 and 82, and preferably less than distance 78 so as to prevent the installation of cells "D", "AA", "AAA" and "C" respectively into the related charging unit 22.

It should not be appreciated that the practice of the present invention provides means, that is charging units 22 and sets 24 of terminals, for accepting five major rechargeable and selectively interlocking the electrical contacts, comprising the stationary members 28 and 28A and the slideable member 26, by means of the described shaped cavities of the charging units 22 and the moveable member 26 interrelated for the terminals 64 and 66 of sets 24. The interlocking of the electrical contacts allows the desired charging rate current to be applied to the cell being charged. The connection of the electrical contacts to the charging network 100 having two paths each generating three different charging rate currents may be described with regard to FIG. 6.

Figure 6:
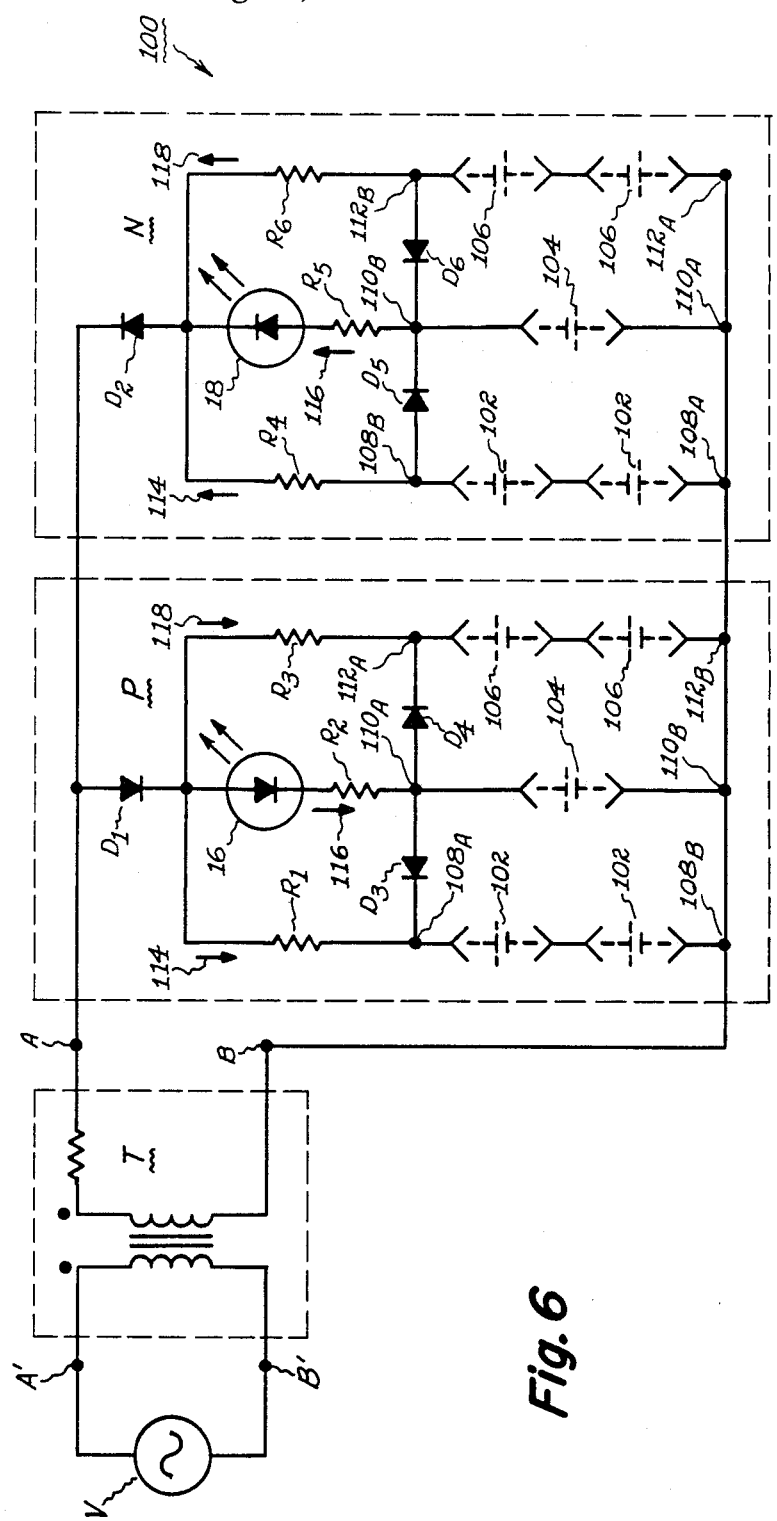
FIG. 6 is a schematic showing the charging network which generates the three different charging rate currents related to the present invention.

FIG. 6 shows a symbol of a battery for a plurality cells indicated by reference numbers 102, 104 and 106 associated with particular rechargeable cells "D", "C", "AA", "AAA" and "9 Volt" which are related to the protrusions of the slideable member 26, the metallic strips 50, 52 and 54 of the stationary members 28 and 28$_A$ and the terminals 64 and 66 of the sets 24 all shown by plug-like symbols as given in Table 1.

TABLE I

| Protrusions | Metallic Strips | Terminals | Cell Types |
|---|---|---|---|
| 62 | 54 | | 102 (AAA) |
| | | 60 and 62 | 104 (9 Volt) |
| 56 and 58 | 50 | | 106 (D, C) |
| 60 | 52 | | 106 (AA) |

In a manner as described with regard to FIGS. 4 and 5, the insertion of one cell, for example, a "D" cell selectively inhibits the charging of the other cells "C", "AA" and "AAA". However, this selective inhibition is related to each of the charging unit and is not common therebetween. For example, one "D" cell may be located in each of charging units 22 located on the left side of the battery charging assembly 10 shown in FIG. 1 while one "C" cell may be located in each of the charging units 22 located in the battery charging assembly 10 shown in FIG. 1.

From FIG. 6 it is seen that the interconnection of cells types 102 and 106 is in a serial manner, that is one cell located in each of two charging unit 22, in order to complete the charging path of the network shown in FIG. 6. However, if desired it may be arranged to interconnect cell types 102 and 106 in a singular manner similar to that shown for cell type 104 to complete the charging path of the network shown in FIG. 6.

FIG. 6 illustrates a schematic diagram of the preferred embodiment of the present invention having a source of AC power V, such as, 110 Volt, 60 Hz line current connected to the input stage of charging network 100 by means of the plug assembly 20 shown in FIG. 1. The input stage is comprised of a voltage transformer T having an impedance $R_T$ and with the AC Source is applied across its A' and B' terminals. The secondary output of Transformer T, at terminals A and B, functions as a source of charging current for the remainder of the circuit. It should be understood that the transformer T is only one of the number of charging current sources that may be used, and this invention should not be considered or limited to any particular current source. In the described circuit, however, a Transformer T is preferred since rectifying can be accomplished after its output stage.

As illustrated in FIG. 6, a positive charging network P and a negative charging network N are connected to in a parallel manner across a secondary output terminals A and B of Transformer T. In order to maximize the operating efficiency of the Transformer T, is it desirable to utilize the arrangement of a first positive charging path formed by network P and second negative charging path formed by network N, thus utilizing both polarities of the AC wave without a center tapped secondary winding. The positive half-cycle of the AC signal provides a charging current to the positive charging network P and a negative half-cycle provides charging current to the negative charging network N.

When the voltage potential across the transformer T, at terminals A and B, is positive diode D1 of the P network is forward biased and diode D2 is of the N network reversed biased thus, positive charging network P is electrically active when negative charging network N is inactive. Similarly, when the voltage potential across the output terminals A and B is negative, diode D1 is reversed bias and diode D2 is forward biased. In this case, the negative charging network N is electrically active when the positive charging network P is electrically inactive. The active state of the P network is preferably indicated by the excitation of a light emitting diode 16, while, the active state of the N network is preferably indicated by the excitation of a light emitting diode 18 both shown in FIGS. 1 and 6.

With regard to FIG. 1, the advantage of the P and N networks of FIG. 6 may be realized by placing rechargeable cells in all four charging units 22 to allow two of these cells to be charged by means of the P network the other two charged by means of the N network. Similarly, one "9 Volt" cell may be inserted into each of the sets 24 of terminals 64 and 66 allowing one such cell to be charged by the P network and the other cell to be charged by the N network.

The various types of cells related to the present invention are desired to be charged by three different charging rate currents depending upon their physical size and electrical characteristics. The charging network 100 of the present invention provides for three charging current rates in each of its P and N network flowing through the network nodes of FIG. 6 related to the particular cells all as given in Table II.

TABLE II

| CHARGING RATE CURRENT | NETWORK NODES | CELLS |
| --- | --- | --- |
| 1 | $108_A$ and $108_B$ | 102 |
| 2 | $110_A$ and $110_B$ | 104 |
| 3 | $112_A$ and $112_B$ | 106 |

The terms A and B of the nodes 108, 110 and 112 are used to symbolize that flow of current that is for example, current flows from node $108_A$ to $108_B$. This type notation is used in both of the P and N networks of FIG. 6.

The charging rate current 1 of Table II is typically 15–18 ma for a period of approximately 16 hours. The charging rate current 2 of Table II is typically 80–100 ma for a period of approximately 16 hours although it is preferred that the AA cell of group 104 be charged at typically 40–50 ma for a period of approximately 16 hours. The charging rate current 3 of Table II is typically 7–10 ma for a period of approximately 16 hours.

The obtainment of these current rate current is determined, in part, by the appropriate selection of the components shown in FIG. 6 of the P and N networks having typical values or of the type given in Table III

TABLE II

| P NETWORK | N NETWORK | VALUE OR TYPE |
| --- | --- | --- |
| R1 | R4 | 360 ohms, ¼Watt |
| R2 | R5 | 120 ohms, ¼Watt |
| R3 | R6 | 39 ohms, ¼Watt |
| D1, D3 and D4 | D2, D5 and D6 | Diode IN 4001 |

As shown in Table II and FIG. 6, the components selection and arrangement of the P and N network provide a similar manner of operation and therefore the operation of the P network is to be discussed with regard to three branches 114, 116, and 118 indicated by arrows pointing in the direction of current flow in each of P and N networks and related to the first, second and third charging rate currents.

Upon the appropriate insertion of the one or more cells into the charging units 22 or sets 24 of terminals 64 and 66, charging current is supplied to the one or more particular cells through branches 114, 116 and 118. Assuming that one cell of the 102 type are inserted into each of the two charging units 22, the first charging rate current via branch 114 is having a value determined by $R_1$, the forward impedance of D1 and the transformer impedance $R_T$ flows through each of these 102 inserted cells. This first charging rate current is also determined by the current flowing in branch 116 which is determined by the value of R2, the forward impedance of diode D2, and the forward impedance of light emitting diode 16. Next, assuming that the cell 104 is installed in one of the set 24 of terminals 64 and 66, the second charging rate current via branch 116 flows into cell 104 and is determined by the value of R2, forward impedance of light emitting diode 16 the forward impedance of $D_1$ and the transformer impedance $R_T$. Current from branch 114 does not flow into cell 104 due to the reversed biased condition of D3. Similarly, current from branch 118 does not flow into cell 104 due to the reversed biased condition of D4. Finally, assuming that one cell of the 106 type are inserted into each of two charging units 22, the third charging rate current via branch 118, having a value determined by R3, forward impedance of D1 and the transformer impedance $R_T$ flows through each of these 106 inserted cells. This third charging rate current is also determined by the current flowing in branch 116 having a value previously discussed with regard to the first charging rate current. It is apparent that a wide range of possible charging rate currents maybe provided by properly selecting the appropriate values of the impedance RT, and resistors R1, R2, R3, R4, R5, R6.

It should now be appreciated that the practice of the present invention provides for a charging network having two paths (P and N networks) with each path having three different charging currents so as to accommodate the five major types of rechargeable cells for their charging thereof. Further it should be appreciated that the practice of the present invention provides means for accepting each of the various types of rechargeable cells and automatically providing the desired charging rate for any of the cells by the shape and the arrangement of the cavities of the charging units 22 along with the interlocking function of the slideable member 26. Still further it should be appreciated that the practice of the present invention provides a lighted indication to notify the operator of the status of the charging being performed by the battery charging assembly of the present invention.

What I claim as new and desire to secure by Letters Patent of the United States is:

1. A charging assembly for at least one rechargeable cell selected from a group of cells of various sizes and having a desired first, second and third desired charging rate currents, said assembly comprising;
    (a) means for connecting to an external power source;
    (b) a charging network connected to said connecting means and providing a first and second charging path with each path having three branches respectively developing said first, second and third charging rate currents;
    (c) means for accepting said selected at least one cell, said cell accepting means connected to said charging network and comprising stationary and moveable charging contacts for respectively receiving charging current in said first and second charging paths, said cell accepting means being connected to said charging network so that the accepted cell is appropriately interconnected to its desired charging rate current, said stationery and moveable contacts allowing only one charging rate current to be developed by said network and
    (d) moveable ejector means arranged between said stationary and moveable charging contacts, said ejector means being moveable so as to contact and assist removal of said selected cell from said means of accepting.

2. A charging assembly according to claim 1 wherein a selected group of rechargeable cells each having one of the desired three charging rate current are insertable into said accepting means and interconnected in a serial manner by said accepting means to said charging network and receiving the same charging rate current.

3. A charging assembly according to claim 2 further comprising two additional cells of the same type which are selected from the group of rechargeable cells and having one of the desired three charging rate currents, said two additional cells each being inserted into said accepting means and interconnected in a serial manner by said accepting means to said charging network and receiving the same charging rate.

4. A charging assembly according to claim 1 further comprising a first and a second light indicator means for indicating the delivery of charging current to said first and second charging paths respectively.

5. A charging assembly according to claim 1 wherein said means for accepting said cells comprises;
   (a) a unit comprising a plurality of cavities respectively shaped to accommodate each of the various sized cells having said first and second charging rate currents, each of said cavities having closed end portions respectively formed by said stationary and moveable contacts.

6. A charging assembly according to claim 5 wherein said means for accepting said cells further comprises;
   (a) a pair of terminals spaced apart from one of said closed ends of said unit by predetermined distance and which are arranged in a manner to receive terminals embedded in and extending out of one type of the said rechargeable cell;
   (b) said slidable member of said chargeable contacts being slidable by an amount which exceeds said predetermined spaced apart distance between said pair of terminals and said closed end of unit when any of said rechargeable cells is inserted in said unit.

7. A charging assembly according to claim 5 wherein said moveable ejector means each have a side portion having a similar shape as said respective cavities.

* * * * *